(12) United States Patent
Helmstetter et al.

(10) Patent No.: US 7,478,128 B2
(45) Date of Patent: Jan. 13, 2009

(54) NOTIFICATION MANAGEMENT FOR MONITORING SYSTEM

(75) Inventors: Barry Frank Helmstetter, Mission Viejo, CA (US); George Schley Whittlesey, III, Mission Viejo, CA (US)

(73) Assignee: Siemens Aktiengesellschaft, Munich (DE)

( * ) Notice: Subject to any disclaimer, the term of this patent is extended or adjusted under 35 U.S.C. 154(b) by 784 days.

(21) Appl. No.: 11/003,990

(22) Filed: Dec. 2, 2004

(65) Prior Publication Data

US 2006/0136583 A1 Jun. 22, 2006

(51) Int. Cl.
*G06F 15/13* (2006.01)
(52) U.S. Cl. .................. 709/204; 709/200; 709/205; 709/206; 709/207; 715/733; 715/734
(58) Field of Classification Search ............... 709/200, 709/204, 205, 206, 207; 715/733, 734
See application file for complete search history.

(56) References Cited

U.S. PATENT DOCUMENTS

| | | | | |
|---|---|---|---|---|
| 6,751,657 | B1* | 6/2004 | Zothner | 709/220 |
| 6,842,774 | B1* | 1/2005 | Piccioni | 709/207 |
| 2002/0169867 | A1* | 11/2002 | Mann et al. | 709/224 |
| 2005/0021622 | A1* | 1/2005 | Cullen | 709/204 |
| 2005/0251571 | A1* | 11/2005 | Karstens | 709/224 |
| 2007/0118599 | A1* | 5/2007 | Castanho et al. | 709/204 |

* cited by examiner

*Primary Examiner*—Jinsong Hu
(74) *Attorney, Agent, or Firm*—Buckley, Maschoff & Talwalkar LLC

(57) ABSTRACT

Some embodiments include an event detector to subscribe to solution members of a condition definition, to receive changes to the solution members, and to evaluate a state of the condition definition a subscription manager to identify users associated with the condition definition, and a notification manager to determine a notification routing for each of the identified users.

20 Claims, 14 Drawing Sheets

NOTIFICATION MANAGEMENT FOR MONITORING SYSTEM

BACKGROUND

1. Field

The embodiments described below relate generally to systems for monitoring data and for notifying users based on the monitored data.

2. Discussion

Conventional industrial systems often rely to some extent on computer-based automation and monitoring. In some examples of monitoring and automation, data arising from the operation of a manufacturing plant is acquired, analyzed and responded to if necessary. The data may arise from independent sources, with each source configured to provide substantially "raw" or "native" information at pre-defined intervals in real or near real-time. The information may consist of numerical values produced by gauges and/or monitors (e.g., speed, temperature, or pressure).

Examples of systems that may acquire, analyze, and act on data include industrial automation systems, supervisory control and data acquisition (SCADA) systems, general data acquisition systems, and plant data historians. These systems may provide alarms or other types of notifications to users based on acquired data. In some examples, a system administrator defines a situation that may be detected based on acquired system data. The administrator also defines a type of notification to be presented in response to detection of the situation, and one or more users to receive the notification.

Other types of notification systems have also been contemplated. Some notification systems allow a user to subscribe to certain information that is of interest to the user. When such information becomes available, the information is transmitted to the user in a particular form, using a particular communication mode, and with a particular frequency, all of which are defined by the subscription.

The foregoing notification systems may provide additional features that attempt to increase the functionality thereof. For example, an administrator may select one or more of several notification modalities (e.g., email, pager, cell phone), may archive notification logs, and may establish groups of users to receive notifications related to respective groups. Despite these and other features, improved management and customization of notifications are desired.

SUMMARY

In order to address the foregoing, some embodiments concern a system, a method, an apparatus, a medium storing processor-executable process steps, and means to receive a condition definition from a first user, receive a first instruction from the first user to provide the first user and a second user with access to the condition definition, receive a second instruction from the first user to subscribe the first user to the condition definition, and receive a third instruction from the second user to unsubscribe the second user from the condition definition.

Some embodiments provide an event detector to subscribe to solution members of a condition definition, to receive changes to the solution members, and to evaluate a state of the condition definition, a subscription manager to identify users associated with the condition definition, and a notification manager to determine a notification routing for each of the identified users.

The appended claims are not limited to the disclosed embodiments, however, as those in the art can readily adapt the teachings herein to create other embodiments and applications.

BRIEF DESCRIPTION OF THE DRAWINGS

The construction and usage of embodiments are set forth in the accompanying drawings, in which like reference numerals designate like parts, and wherein.

DETAILED DESCRIPTION

Figure 1:
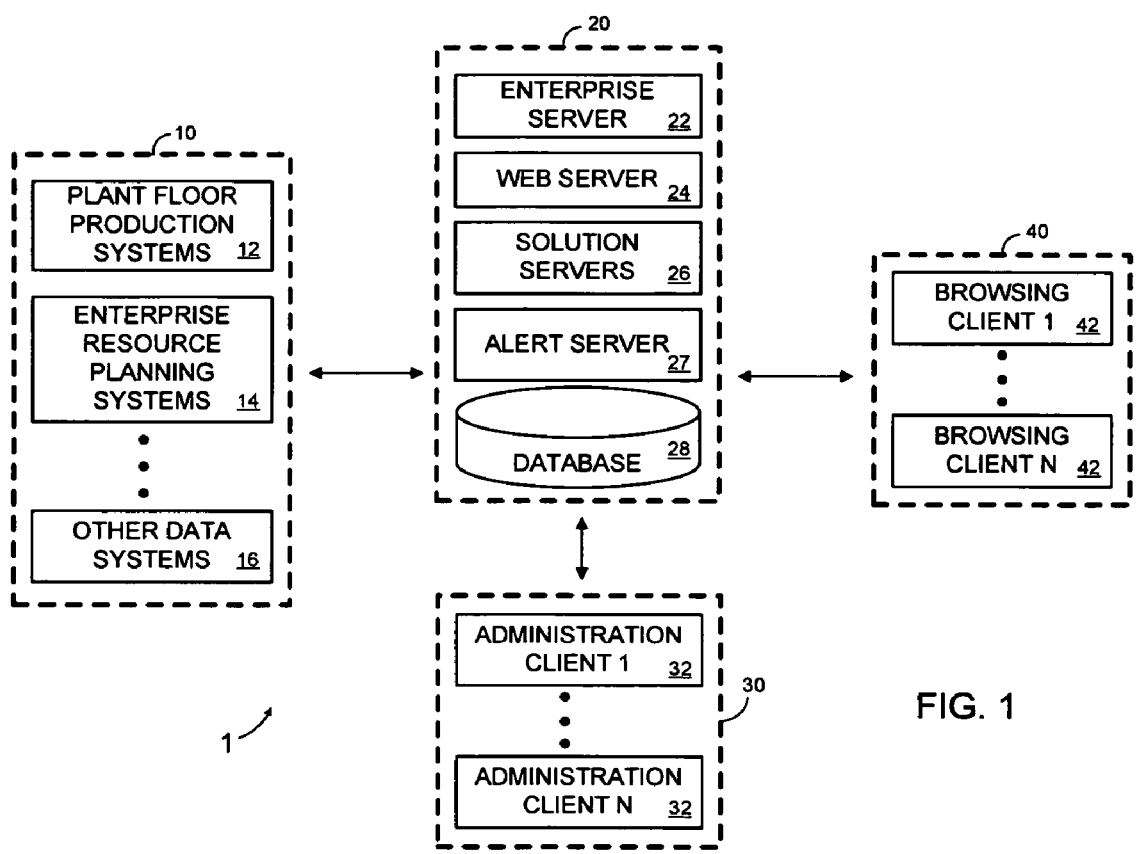
FIG. 1 is a block diagram of a system architecture according to some embodiments.

FIG. 1 illustrates an architecture of system 1 according to some embodiments. It should be noted that other architectures may be used in conjunction with other embodiments. System 1 includes back-end data environment 10 in communication with application environment 20. Also in communication with application environment 20 are administration environment 30 and browsing environment 40.

As used herein, systems "in communication" with one another are directly or indirectly capable of communicating over any number of different systems, ports, interfaces, and so on for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Back-end data environment 10 comprises various data sources, such as plant floor production systems 12, enterprise resource planning data systems 14, and other data systems 16.

When employed in an industrial context, data arising from back-end data environment 10 may be associated with any aspect of industrial operations, and may consist of "point" data that indicates a physical value (e.g., speed, temperature, or pressure). The data may also include "non-point" data used to characterize, contextualize, or identify the point data and/or the source of the point data. Each data source of back-end data environment 10 may comprise many disparate hardware and software systems, some of which may not be interoperable with one another.

Application environment 20 may issue queries for data to back-end data environment 10. In response, back-end data environment 10 acquires and transmits the data to application environment 20. Such communication may employ any system for querying and responding that is or becomes known.

Application environment 20 may comprise enterprise server 22, Web server 24, one or more solution servers 26, alert server 27, and database 28. Application environment 20 may comprise or be integrated as components of a single server device or multiple devices. In various embodiments, enterprise server 22 and solution servers 26 may comprise application programs developed for example using Java and/or C++ and running under, for example, operating systems such as the Windows™ family of operating systems.

Database 28 may store data used during the operation of application environment 20. The data may include condition definitions, subscriptions, and notification routings. The data may also include excursion logs and notification logs.

A condition definition may comprise an expression that may be evaluated based on data (i.e. solution members) received from back-end environment 10. In one example, "Reactor_$B_{Temp1}$>150° C." is a condition definition that may be evaluated as based on the solution member Reactor_$B_{Temp1}$. This condition may be evaluated as "Active" if a value of Reactor_$B_{Temp1}$ is greater than 150° C. and may be evaluated as "Inactive" if the value of Reactor_$B_{Temp1}$ is less than 150° C. A condition definition may include any number of solution members according to some embodiments.

A subscription associates a user with a condition definition. The subscription indicates that a notification is to be routed to the user under specified circumstances related to the condition definition. In some embodiments, a subscription may indicate that a notification is to be routed to a user if a state of the condition definition changes, if the state becomes "Active", and/or if the state becomes "Inactive".

A notification routing may be associated with a user and a subscription. The notification routing indicates the manner in which a notification is to be routed to the user if the subscription requires such a notification. A notification routing may specify any form or forms of communication that are or become known. Non-exhaustive examples include email, pager, instant message, and telephone call.

Usage of the foregoing data types according to some embodiments will be described in detail below.

Data may be stored in database 28 according to any currently- or hereafter-known protocol for storing data. Database 28 may also comprise a front-end application that is usable to access and/or manage the data stored therein. Such a front-end application may support Structured Query Language (SQL) commands or the like.

Solution servers 26 are used to access data from back-end environment 10. In some embodiments, solution servers 26 include solutions and connectors. A solution is an object instance that is associated with particular data of back-end environment 10. A connector comprises processor-executable process steps to populate such an object instance with the particular data. Solution servers 26 thereby allow application environment to access data that is acquired and stored by disparate systems of back-end environment 10.

Web server 24 manages data communication between application environment 20, administration environment 30, and browsing environment 40. One or both of administration environment 30 and browsing environment 40 may execute one or more Java applets to interact with Java servlets of Web server 24 according to some embodiments.

Alert server 27 may manage notifications based on condition definitions, subscriptions, and notification routings according to some embodiments. The definitions, subscriptions, and notification routings may be received from administration environment 30 and/or browsing environment 40 according to some embodiments. Alert server 27 may include processor-executable process steps to receive a condition definition from a first user, receive a first instruction from the first user to provide the first user and a second user with access to the condition definition, receive a second instruction from the first user to subscribe the first user to the condition definition, and receive a third instruction from the second user to unsubscribe the second user from the condition definition.

In some embodiments, process steps of alert server 27 provide an event detector to subscribe to solution members of a condition definition, to receive changes to the solution members, and to evaluate a state of the condition definition, a subscription manager to identify users associated with the condition definition, and a notification manager to determine a notification routing for each of the identified users. Elements and operation of alert server 27 according to some embodiments are discussed below.

Administration environment 30 comprises one or more administration clients 32. Each administration client 32 may comprise processor-executable process steps executed by a respective administration device. An administration client 32 may provide interfaces to create condition definitions and to associate subscriptions with the condition definitions. An administration client 32 may also or alternatively provide interfaces to define notification routings to associate with subscriptions. An administrator may manipulate these interfaces to provide the condition definitions, subscriptions, and notification routings to database 28 via Web server 24. An administration client 32 may also receive notifications according to some embodiments.

An administration client 32 may also allow an administrator to create or modify a solution and its associated connector to back-end data sources. In some embodiments, system 1 supports Microsoft's Dynamic Data Exchange (DDE) protocol and Microsoft's Open Database Connectivity (ODBC) application programming interface for connecting to data sources of back-end environment 10.

In a case that an administration client 32 comprises a Web browser or a Java applet, a respective administration device may comprise any currently- or Hereafter-known device capable of executing such a browser or applet. Examples of administration devices according to some embodiments include, but are not limited to, a desktop computer, a laptop computer, a computer terminal, a personal digital assistant, a telephone, and a tablet computer.

Browsing environment 40 comprises one or more browsing clients 42. Each browsing client 42 may comprise processor-executable process steps executed by a respective user device. In some embodiments, a browsing client 42 may provide interfaces to associate subscriptions with condition definitions. A browsing client 42 may also or alternatively provide interfaces to define notification routings to associate with subscriptions. A user may manipulate these interfaces as described below to define and edit subscriptions and notification routings. A browsing client 42 may also receive notifications according to some embodiments.

A browsing client 42 may comprise a communication application such as a Web browser or a Java applet. As such, a browsing client 42 may be connected to application environment 20 through the Internet or through an Intranet. A browsing client 42 may comprise any other suitable software application according to some embodiments. Browsing clients 42 may be executed by any suitable user device, including but not limited to those mentioned above with respect to administration environment 30. In some embodiments, a same device may be used to execute an administration client 32 and a browsing client 42.

The environments of FIG. 1 may be connected differently than as shown, and each block shown may be implemented by one or more hardware and software elements. These various hardware and software elements of one or more blocks may be located remotely from each other or integrated together. Some embodiments may include environments, systems, servers, and clients that are different from those shown.

Figure 2:
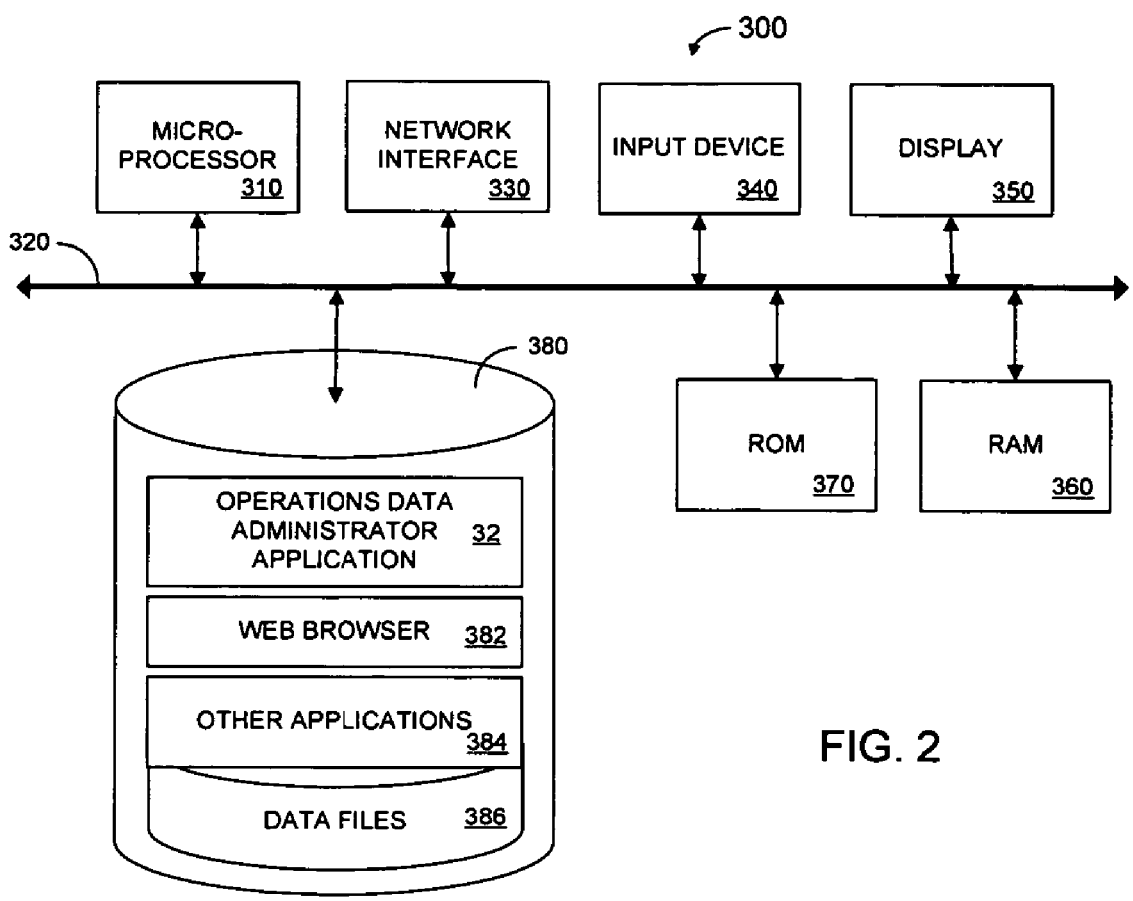
FIG. 2 is a block diagram illustrating an internal architecture of an administration device according to some embodiments.

FIG. 2 is a block diagram of an internal architecture of administration device 300 according to some embodiments. Administration device 300 may operate to transmit a condition definition to application environment 10, to instruct application environment 10 to provide a first user and a second user with access to the condition definition, and to instruct application environment 10 to subscribe and unsubscribe users to and from the condition definition. In some embodiments, administration device 300 may operate to define notification routings and associate the notification routings with a subscription.

In at least one embodiment, administration device 300 includes microprocessor 310 in communication with communication bus 320. Microprocessor 310 may comprise a Pentium™ microprocessor or other type of processor and is used to execute processor-executable process steps so as to control the elements of administration device 300 to provide desired functionality.

Also in communication with communication bus 320 is communication port 330. Communication port 330 is used to transmit data to and to receive data from devices external to administration device 300 such as a device housing Web server 24 and/or alert server 27. Communication port 330 is therefore preferably configured with hardware suitable to physically interface with desired external devices and/or network connections. For example, communication port 330 may comprise an Ethernet connection to a local area network through which administration device 300 may receive and transmit information over a network.

Input device 340 and display 350 are also in communication with communication bus 320. Any known input device may comprise input device 340, including a keyboard, mouse, touch pad, voice-recognition system, or any combination of these devices. Of course, information may also be input to administration device 300 via communication port 330. Display 350 may be an integral or separate CRT (Cathode Ray Tube) display, flat-panel display or the like used to present graphics and text in response to commands issued by microprocessor 310.

According to some embodiments, display 350 displays interfaces that may be manipulated by an administrator using input device 340 to create condition definitions, to provide selected users with access to the condition definitions, to subscribe users to the condition definitions, and to define notification routings associated with the subscriptions. Some examples of such interfaces are described below.

RAM (Random Access Memory) 360 is connected to communication bus 320 to provide microprocessor 310 with fast data storage and retrieval. In this regard, processor-executable process steps being executed by microprocessor 310 are typically stored temporarily in RAM 360 and executed therefrom by microprocessor 310. ROM (Read Only Memory) 370, in contrast, provides storage from which data can be retrieved but to which data cannot be stored. Accordingly, ROM 370 may be used to store invariant process steps and other data, such as basic input/output instructions and data used during boot-up of administration device 300 or to control communication port 330. One or both of RAM 360 and ROM 370 may communicate directly with microprocessor 310 instead of over communication bus 320.

Data storage device 380 stores, among other data, processor-executable process steps of operations data administrator application 32. Operations data administrator application 32 may comprise an implementation of an administration client 32 and is therefore labeled similarly. Administration device 300 may execute process steps of operations data administrator application 32 to provide the functions attributed herein to administrator device 300. Operations data administrator application 32 may comprise a Java applet or a standalone application suitable for the operating system of administration device 300.

Web browser 382 may comprise processor-executable process steps of a Web client. As such, administration device 300 may execute process steps of Web browser 382 to request and receive Web pages from a Web server such as Web server 24. A Java applet such as operations data administrator application 32 may execute within an execution engine provided by Web browser 382.

Data storage device 380 also includes processor-executable process steps of other applications 384. Other applications 384 may include process steps to perform calendaring, e-mail functions, word processing, accounting, presentation development and the like. Data storage device 380 may also store process steps of an operating system (not shown). An operating system provides a platform for executing applications, device drivers and other process steps that interact with elements of administration device 300. Data files 386 may include any electronic files usable by any application of administration device 300.

Figure 3:
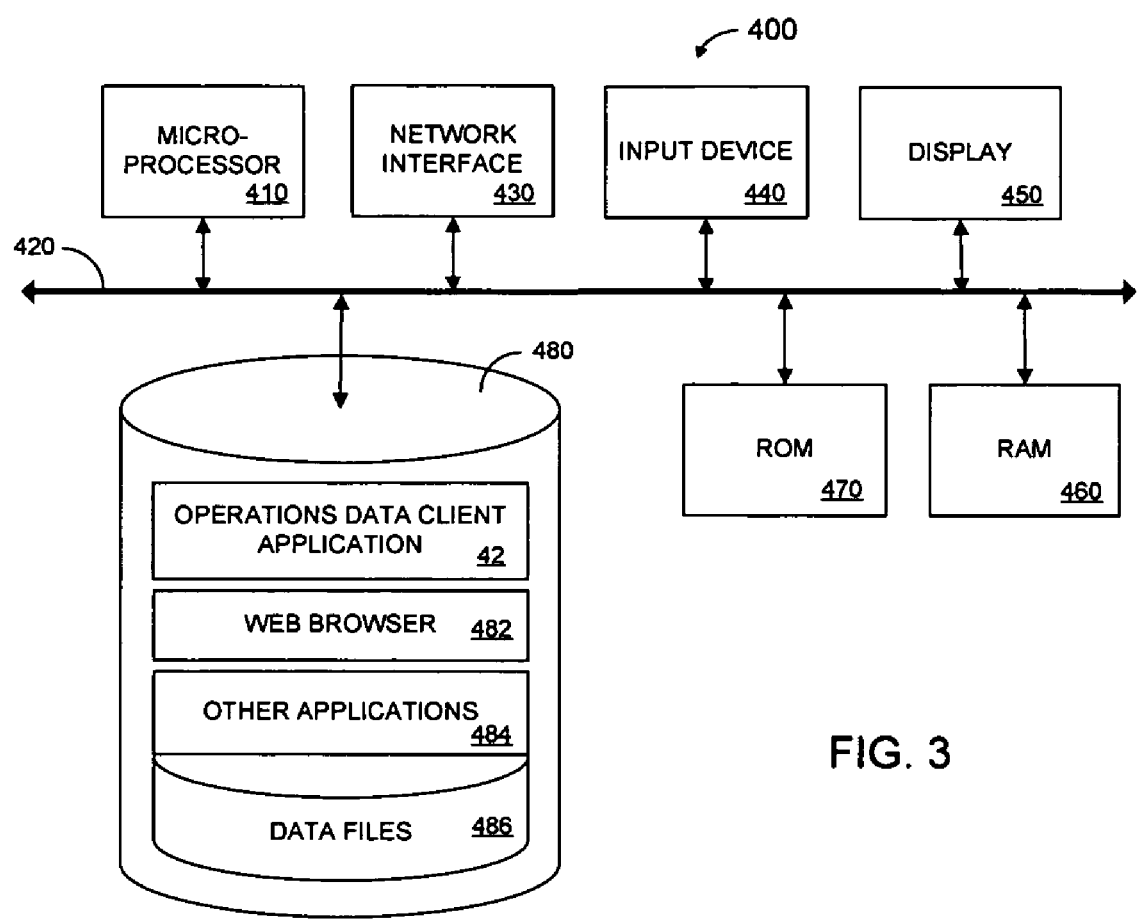
FIG. 3 is a block diagram illustrating an internal architecture of a user device according to some embodiments.

FIG. 3 is a block diagram of an internal architecture of user device 400 according to some embodiments. User device 400 may execute a browsing client 42 of browsing environment 40. The illustrated elements of user device 400 may be implemented as described above with respect to similarly-named elements of administration device 300. Of course, the elements of user device 400 may operate to provide the functionality attributed herein to user device 400. For example, user device 400 may operate to unsubscribe a user from a condition definition, to define a notification routing associated with a subscription, and/or to display a notification received from alert server 27.

Data storage device 480 of user device 400 stores, among other data, processor-executable process steps of operations data client application 42. Operations data client application 42 may comprise an implementation of a browsing client 42 and is therefore labeled similarly. Operations data client application 42 may be provided, for instance as a Java applet executing within an execution engine provided by or through Web browser 482.

Web browser 482 may comprise processor-executable process steps of a Web client. As such, user device 400 may execute process steps of Web browser 482 to request and receive Web pages from a Web server such as Web server 24.

A Java applet such as operations data client application 42 may execute within an execution engine provided by Web browser 482.

Data storage device 480 also includes processor-executable process steps of other applications 484. Other applications 484 may include process steps to perform calendaring, e-mail functions, word processing, accounting, presentation development and the like. Data files 486 may include any electronic files usable by any application of user device 400. Data storage device 480 may also store process steps of an operating system (not shown).

The process steps stored in data storage devices 380 and 480 may be read from one or more of a computer-readable medium, such as a floppy disk, a CD-ROM (Compact Disc-Read Only Memory), a DVD-ROM (Digital Video Disc-Read Only Memory), a Zip™ disk, a magnetic tape, or a signal encoding the process steps, and then stored in data storage devices 380 and 480 in a compressed, uncompiled and/or encrypted format. In alternative embodiments, hard-wired circuitry may be used in place of, or in combination with, processor-executable process steps for implementation of processes according to some embodiments. Thus, embodiments are not limited to any specific combination of hardware and software.

Figure 4:
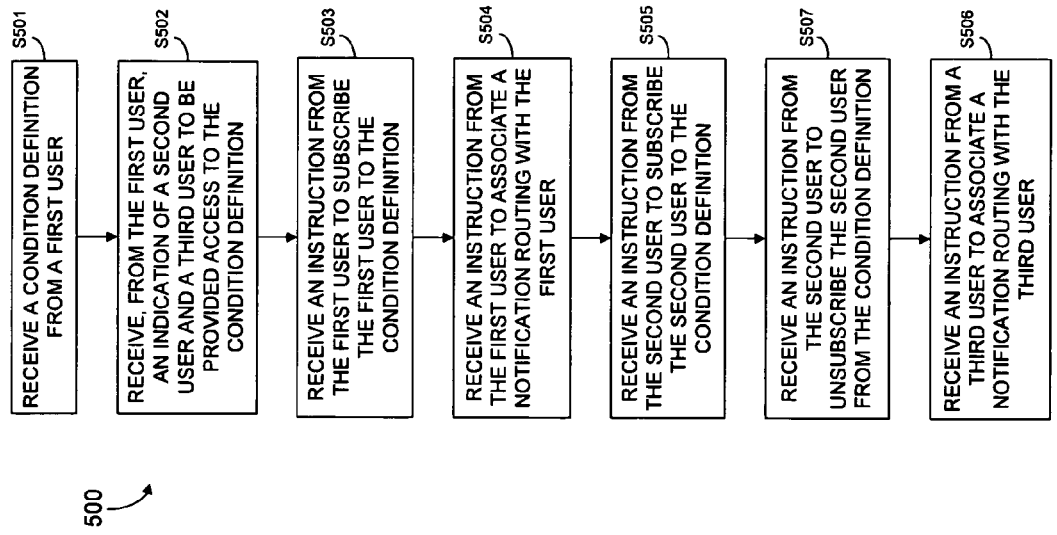
FIG. 4 illustrates a flow diagram of process steps according to some embodiments.

FIG. 4 illustrates process steps 500 according to some embodiments. Process steps 500 are described below as if embodied in alert server 27. However, process steps 500 may be embodied in one or more software or hardware elements and executed, in whole or in part, by any device or by any number of devices in combination, including administration device 300 and user device 400. Moreover, some or all of process steps 500 may be performed manually.

Briefly, process steps 500 may be executed to receive a condition definition from a first user, receive a first instruction from the first user to provide the first user and a second user with access to the condition definition, receive a second instruction from the first user to subscribe the first user to the condition definition, and receive a third instruction from the second user to unsubscribe the second user from the condition definition.

A condition definition is received from a first user at step S501. For purposes of the present example, it will be assumed that the first user is an administrator operating administration device 300. According to some embodiments, the first user is a user without administrator privileges operating user device 400.

Figure 5:
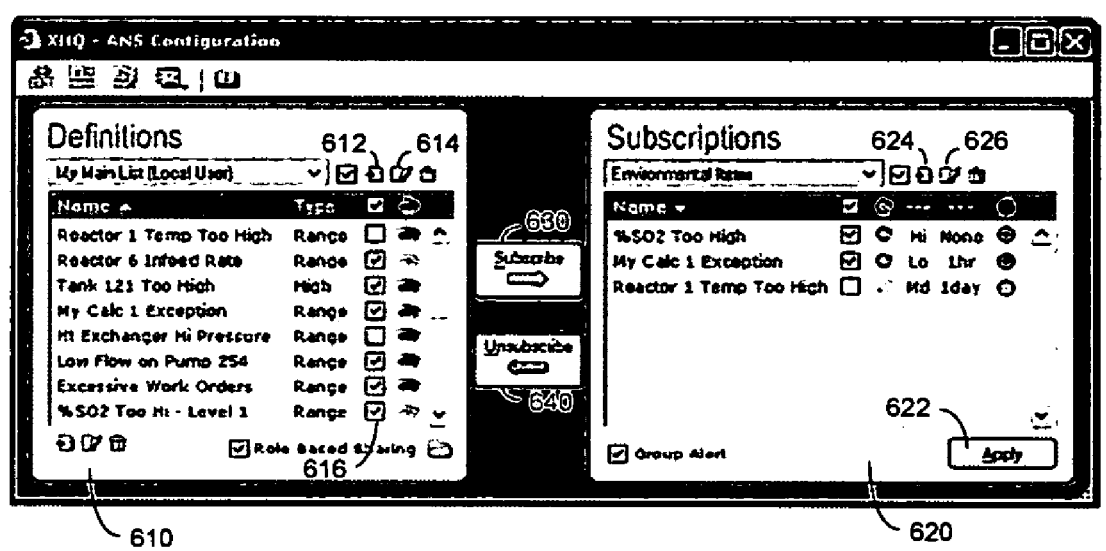
FIG. 5 is an outward view of a Configuration interface according to some embodiments.

FIG. 5 illustrates Configuration dialog 600 that may be used to receive a condition definition according to some embodiments of step S501. For example, the administrator may operate administration device 300 to launch process steps of operations data administrator application 32. Administration device 300 then operates to request and receive a list of condition definitions and associated subscriptions from database 28 directly or via other elements of application environment 20. The definitions and subscription information are then displayed in Configuration dialog 600 on display 350.

Figure 6:
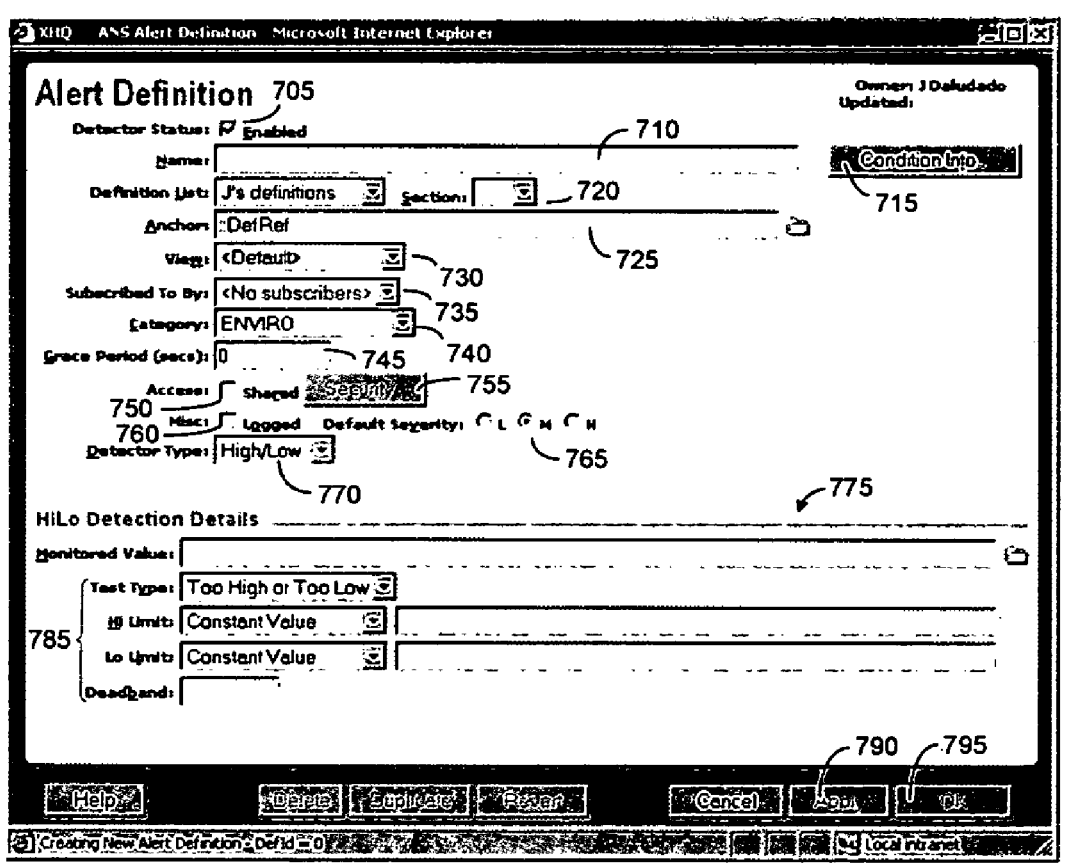
FIG. 6 is an outward view of an Alert Definition interface according to some embodiments.

Configuration dialog 600 includes definitions interface 610. Definitions interface 610 lists condition definitions to which the administrator has access. The administrator may select icon 612 to create a new condition definition or icon 614 to edit the condition definition currently selected in definitions interface 610. In response, a dialog such as Alert Definition dialog 700 of FIG. 6 may be displayed on display 350. The fields of Alert Definition dialog 700 will be populated if icon 614 was selected, and empty if icon 612 was selected. More specifically, if icon 614 was selected, operations data administrator application 32 receives data associated with the selected condition definition from application environment 20, and populates appropriate fields of dialog 700 with the received data.

Checkbox 705 allows the administrator to enable or disable the displayed condition definition. A disabled condition definition is not monitored by system 1 according to some embodiments. As a result, any subscriptions to the disabled definition are effectively disabled.

A name of the condition definition may be input and displayed in input area 710. The name may be the primary identifier for the condition definition on all dialogs presented to the administrator and/or user. Button 715 may be selected to launch a window for inputting additional information descriptive of the condition definition.

Interface 720 allows the administrator to assign the condition definition to a particular definition list. Definition lists may be used to logically organize condition definitions according to any desirable convention. In some embodiments, a condition definition may only be assigned to a definition list that is owned by the assignor.

Anchor field 725 indicates an object to which the condition definition is to be identified. The anchor may be used to limit the scope of log reports, alert status, etc., and may allow the assignment of particular views to the condition definition. A view may comprise a particular arrangement and selection of data to be displayed to a user or administrator. In this regard, the administrator may associate a particular view with the condition definition using view interface 730. In some embodiments, view interface 730 is populated with a list of views that are associated with the anchor specified in field 725.

Interface 735 lists each user currently subscribed to the condition definition, and interface 740 allows an administrator to assign the condition definition to a category. The administrator may specify a grace period during which alert server 27 is to wait before declaring a state change of the condition definition.

Checkbox 750 indicates whether the condition definition will be shared with users other than the administrator/user who created the definition. If checked, then button 755 is selectable to launch a dialog for specifying users with whom the condition definition will be shared. Such users are able to view and/or subscribe to thusly-shared condition definitions.

Figure 7:
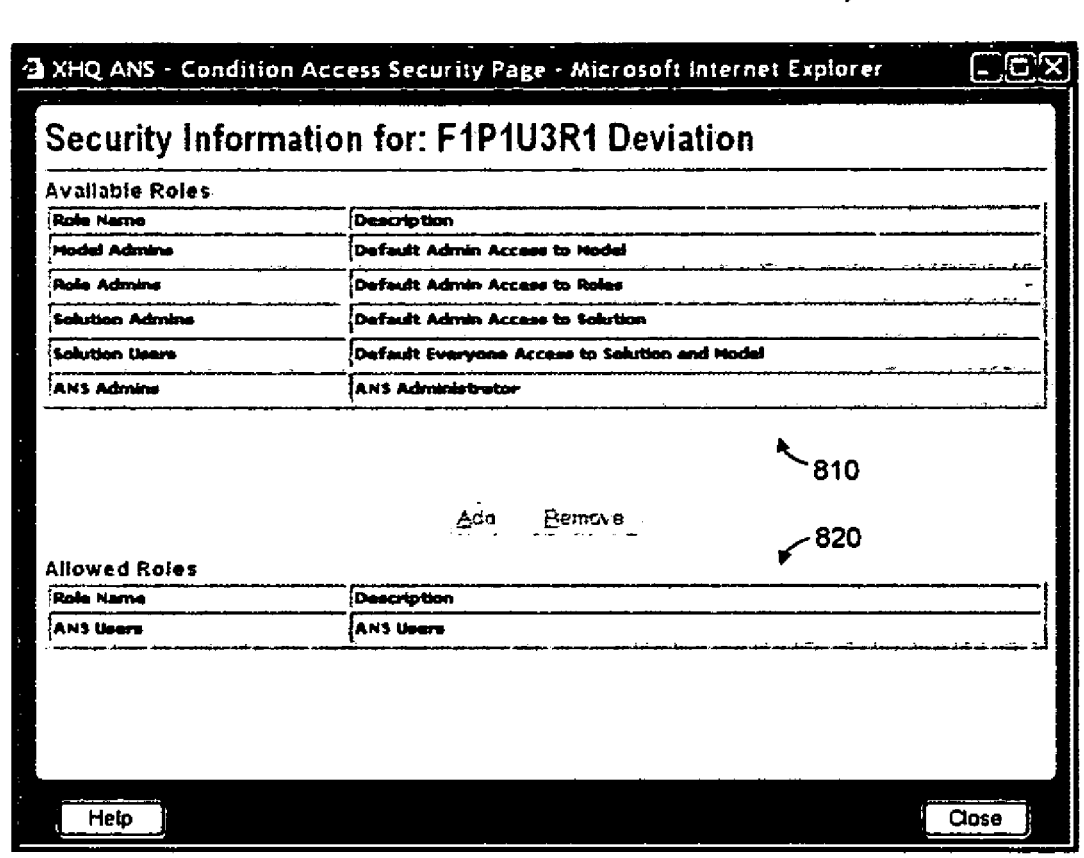
FIG. 7 is an outward view of a Security interface according to some embodiments.

Dialog 800 of FIG. 7 is one example of a dialog that may be launched in response to selection of button 755. Dialog 800 allows the administrator to select one or more of available roles 810 for addition to allowed roles 820. One or more of allowed roles 820 may be removed therefrom if desired. As shown, a role is a particular category of users that may be defined by an administrator. Some users may be associated with more than one role. According to the present example, the allowed role "ANS Users" is associated with a second user and a third user, each of who may or may not also possess administrator rights.

Checkbox 760 of dialog 700 enables logging of "excursions" of the condition definition. An excursion, according to some embodiments, is an event summary record that characterizes a period between a detection of an Active state of the condition and a detection of an Inactive state of the condition. Logged excursions may be viewed using a log viewer as described below with respect to FIG. 14.

The condition definition is associated with a severity in interface 765. The severity may be used to sort and filter condition definitions. The sorting and filtering may be reflected by a log viewer and/or a status display such as that shown in FIG. 13 and described below. The associated severity may be used as a default severity of a subscription to the condition definition.

Interface 770 specifies a type of condition detection mechanism that will be used for the condition definition. Some embodiments provide for high/low limit, rate of change, deviation, and staleness detection mechanisms. Other mechanisms may be used in conjunction with some embodiments. The mechanism selected in interface 770 determines a number and type of interfaces displayed by area 775.

The present example illustrates area 775 in a case that a high/low limit detection mechanism is specified in interface 770. Input area 780 specifies the primary value, or solution member, to track for the condition definition. The value may be specified as a path of an object namespace or an alias according to some embodiments. Interfaces 785 may be used to specify parameters that are specific to a high/low limit detection mechanism, including test type (e.g. Too Low, Too High, Too High or Too Low), High Limit, Low Limit, and Deadband (i.e. an absolute value that reduces the high limit and increases the low limit when a condition is Active.

Returning to step S501, selection of buttons 790 or 795 may cause administration device 300 to transmit and application environment 20 to receive the condition definition defined in dialog 700. The definition may be stored within database 28. Such transmission and storage may also implement step S502, in which an indication of the second and third users to be provided access to the condition definition is received. This indication may be an element of the condition definition that is specified using dialog 800 as mentioned above.

Checkboxes 616 of interface 610 indicate, for each displayed condition definition, whether the condition definition is accessible to other users. According to some embodiments, such access to a condition definition allows the other users to subscribe to the condition definition. In this regard, dialog 600 of FIG. 6 also displays subscriptions interface 620. Subscriptions interface 620 lists those subscriptions to which the administrator is subscribed.

At step S503, the administrator may select subscribe button 630 to subscribe to a condition definition selected in definitions interface 610. As a result, the name of the condition definition appears in interface 620. The administrator then selects button 622 to create the subscription. In some embodiments of step S503, alert server 27 thereby receives an instruction to subscribe the administrator to the condition definition and associates a subscription with the administrator and the condition definition in database 28. Unsubscribe button 640 may be used similarly to unsubscribe to a selected condition definition.

Figure 8:
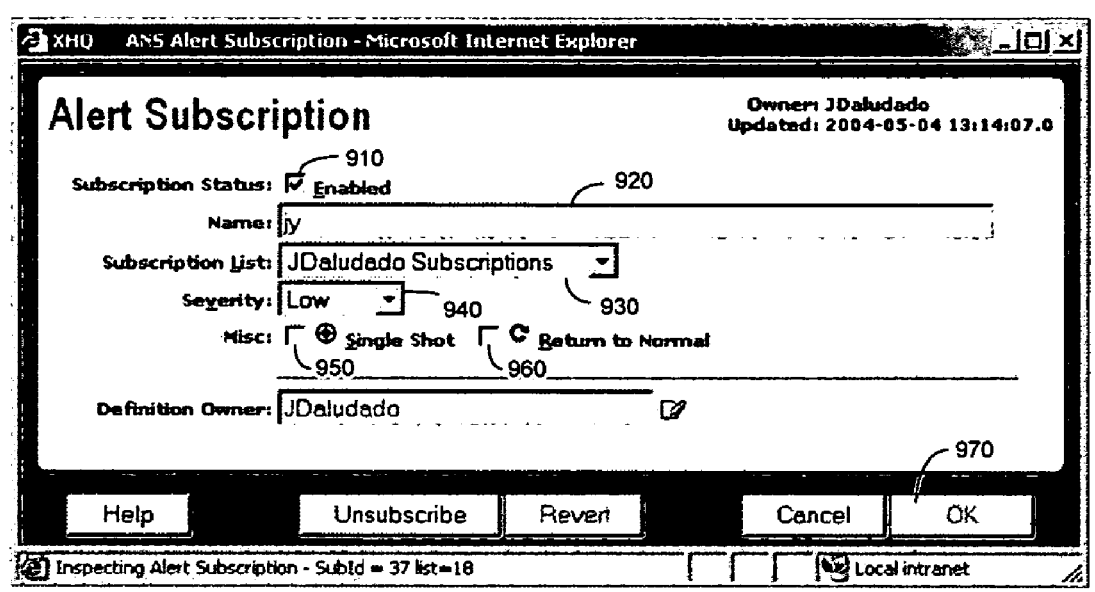
FIG. 8 is an outward view of a Subscription interface according to some embodiments.

The administrator may select icon 624 to create a new subscription or icon 626 to edit details of the currently-selected subscription. Alert Subscription dialog 900 of FIG. 8 may provide such creation or editing according to some embodiments. In particular, if icon 626 was selected, operations data administrator application 32 receives data associated with the selected subscription from database 28 and populates appropriate fields of dialog 900 with the received data.

Checkbox 910 controls whether notifications will be routed based on the subscription. Notifications will be described in more detail below. Interface 920 displays the subscription name. In some embodiments, the name is identical to the name of the condition definition with which the subscription is associated. Interface 930 allows the administrator to assign the subscription to a particular subscription list. Subscription lists may be used to logically organize subscriptions according to any desirable convention.

Checkbox 950, if checked, indicates that subscribers are to receive a notification of only the first occurrence of the associated condition. The subscription is automatically disabled after the first occurrence. Checkbox 960 allows subscribers to be notified in a case that the associated condition enters the Active state as well as in a case that the condition returns to the Inactive state. Any changes to the subscription are stored in database 28 upon selection of button 970. As shown, interface 620 indicates the status of checkboxes 910, 950 and 960 for each subscription displayed therein.

Figure 9:
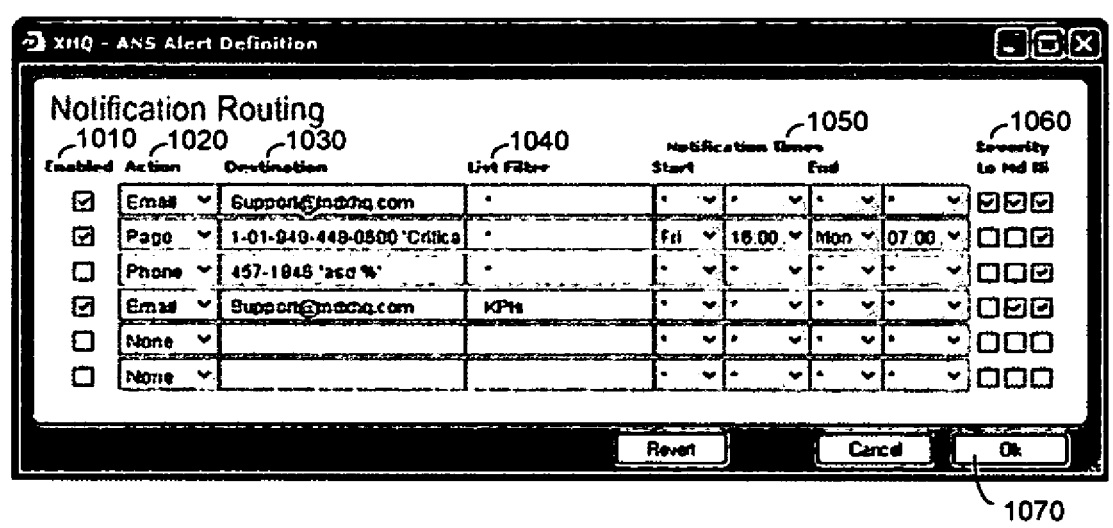
FIG. 9 is an outward view of a Notification Routing interface according to some embodiments.

An instruction may be received at step S504 to associate a notification routing with the administrator and the condition definition defined at step S501. In some embodiments, the notification routing is defined using Notification Routing dialog 1000 of FIG. 9. Notification Routing dialog 1000 displays a list of routings currently defined for the administrator, assuming of course that the administrator has accessed dialog 1000.

Checkbox 1010 indicates whether a notification routing is enabled. If a condition definition becomes active, and the administrator is subscribed to the condition definition, the administrator will receive a notification in accordance with the enabled notification routing. Interface 1020 indicates a notification type. Non-exhaustive examples of notification types include email, pager, and phone. Destination field 1030 indicates a destination for the notification that corresponds to the selected notification type.

List Filter field 1040 indicates the subscription list or lists that may be sources for notifications according to the subject routing. Interface 1050 allows notification routings to be associated with time intervals. For example, an email notification routing may be associated with a time interval from 9 am to 5 pm, while a pager notification routing may be associated with a time interval from 5 pm to 9 am.

Severity interface 1060 indicates the severity of subscriptions with which the notification routing is to be associated. For example, a notification routing that is associated with a low "L" severity will be used to notify of Active conditions that are associated with low severity subscriptions. On the other hand, a notification routing that is associated with a medium "M" and high "H" severity will be used to notify of Active conditions that are associated with both medium and high severity subscriptions.

Buttons 1070 may be selected to transmit the notification routings to database 28. An instruction to associate the notification routings with the administrator is therefore received by application environment 20 at step S504.

As mentioned above, a second user and a third user were provided with access to the condition definition of the present example. The second user may operate user device 400 to launch operations data client application 42. In response, application environment 20 transmits condition definitions to which the second user has access and any associated subscription information to user device 400. Operations data client application 42 uses the condition definitions and subscription information to populate and to display a Configuration dialog similar to dialog 600 of FIG. 5.

According to the present example, the condition definition described above is presented to the second user within interface 610. At step S505, the second user may select the condition definition and subscribe to the condition definition using button 630. The second user may edit details of the subscription using dialog 700 as described above. Then, by selecting button 622, the second user transmits an instruction to subscribe the second user to the condition definition. Application environment 20 receives the instruction and database 28 associates the second user with the condition definition and the newly-created subscription.

Similarly, the second user may unsubscribe from the condition definition by selecting the condition definition within interface 620 and button 640 of dialog 600. The subscription is thereby removed from interface 620. The second user then selects button 622 to transmit an instruction to unsubscribe the second user from the condition definition. Application environment 20 receives the instruction at step S506 and database 28 disassociates the subscription from the condition definition.

According to some embodiments, the third user may operate user device 400 or another user device to launch a browsing client 42 such as operations data client application 42. As mentioned above, the third user may or may not possess administrator rights. The third user may issue an instruction at step S507 to associate a notification routing with the third user.

In some examples of the foregoing, the third user may access and manipulate Notifications Routing dialog 1000 to create one or more notification routings. These notification routings will be used to notify the third user in accordance with any subscriptions that are associated with the third user. One such subscription may be associated with the condition definition created at step S501. An instruction to associate the notification routings with the third user may be received by application environment 20 at step S507 upon selection of button 1070.

Process steps 500 illustrate one example of improved management and customization of notifications that may be provided by some embodiments.

Figure 10:
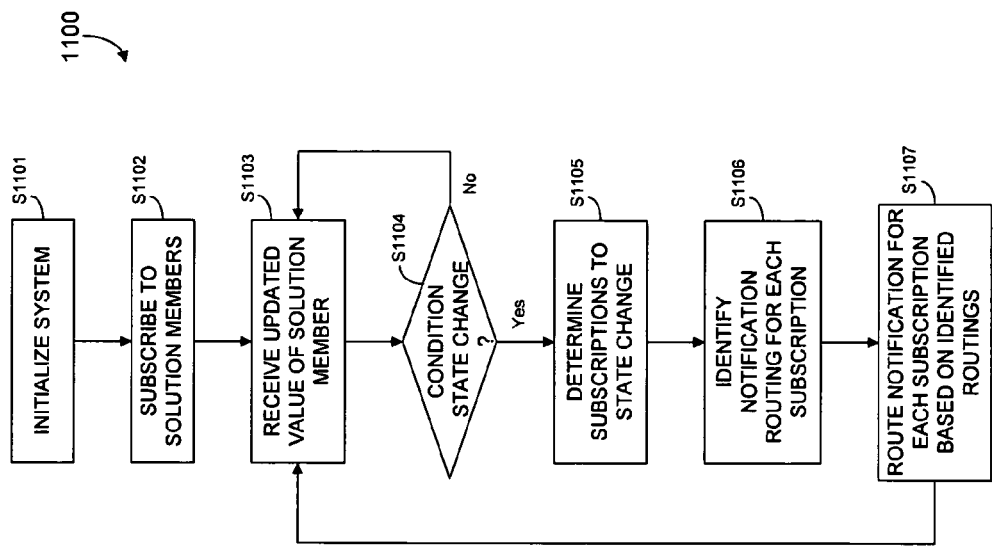
FIG. 10 illustrates a flow diagram of process steps according to some embodiments.

FIG. 10 shows process steps 1100 according to some embodiments. Some embodiments of process steps 1100 will be described below with respect as if embodied by processor-executable code of alert server 27. However, process steps 1100 may be embodied in one or more other software or hardware elements and executed, in whole or in part, by any device or by any number of devices in combination.

Figure 11:
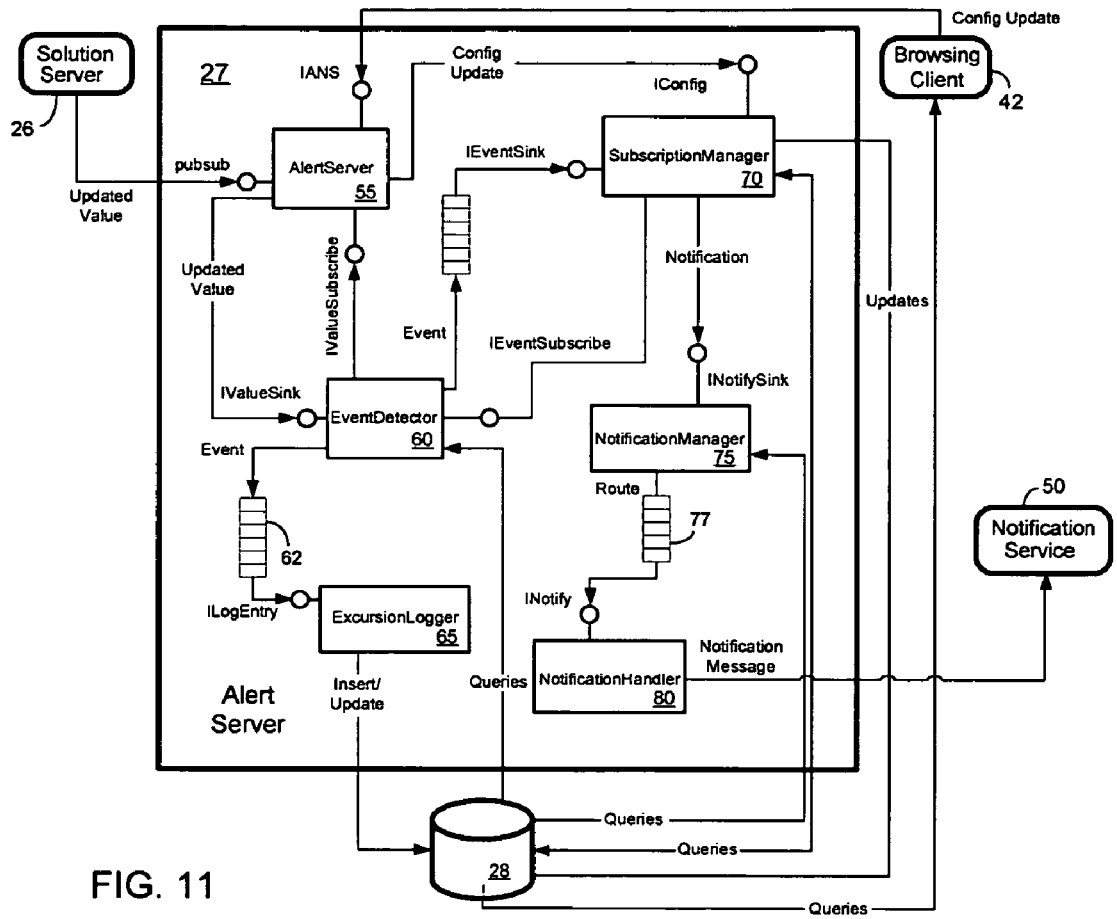
FIG. 11 is a block diagram of modules, interfaces and dataflow within an Alert Server according to some embodiments.

FIG. 11 is a data flow diagram of alert server 27 for use in describing some embodiments of alert server 27 as well as the execution of process steps 1100 according to some embodiments. As shown, alert server 27 is in communication with a solution server 26, database 28, a browsing client 42, and notification service. Alert server 27 comprises several modules, or classes, which will be briefly described prior to the description of process steps 1100.

AlertServer class 55 uses a socket-based pub/sub mechanism to subscribe to solution members monitored by the solution server 26. AlertServer 55 thereby receives updated values of the solution members from the solution server 26. AlertServer 55 exposes the IValueSubscribe interface that is used by other classes (e.g. EventDetector class 60) to identify the solution members to which AlertServer 55 should subscribe.

AlertServer 55 also receives configuration updates such as condition definition creation/modification, subscription creation/modification, and notification routing creation/modification from the browsing client 42 through the IANS socket-based mechanism. In some embodiments, the configuration updates are received by Web server 24 and then passed to AlertServer 55.

EventDetector 60 exposes the IValueSink interface, which is used by AlertServer 55 to pass changed solution member values to EventDetector 60. EventDetector 60 evaluates condition definitions to detect whether events have occurred. An event may be detected if a state of a condition definition changes based on changed values of one or more solution members. EventDetector 60 also exposes the IEventSubscribe interface, which may be used to indicate those condition definitions to which users are subscribed.

ExcursionLogger class 65 logs alerts to database 28. ExcursionLogger exposes the ILogEntry interface, which is called by EventDetector 60 to indicate detected excursions.

SubscriptionManager class 70 manages event notification to different notification routings once an event is detected. EventDetector 60 notifies Subscription manager 70 of a detected event using the IEventSink interface. SubscriptionManager 70 also receives configuration updates from AlertServer 55 via the IConfig interface. The updates are stored in database 28 by SubscriptionManager 70.

NotificationManager class 75 receives notification messages from SubscriptionManager 70 via the INotifySink interface. NotificationManager 75 determines one or more routes for the messages based on queries to database 28 and queues the messages in queue 77 based on the routing. NotificationHandler class 80 exposes the INotify interface, through which is received a specific notification message for a specific user and a specific route. Each instance of a notification message passed to an appropriate notification service 50 for delivery of the message.

Process steps 1100 will now be described in the context of the foregoing embodiment of alert server 27. It will be assumed that, prior to step S1101, database 28 stores condition definitions associated with subscriptions and one or more users, as well as notification routings associated with the one or more users.

Alert server 27 is initialized at step S1101. In some embodiments of step S1101, AlertServer 55 creates an instance of each of the SubscriptionManager, ExcursionLogger, and NotificationManager classes. Next, SubscriptionManager 70 acquires all condition definitions associated with one or more enabled subscriptions from database 28. For each condition definition, SubscriptionManager 70 creates an instance of EventDetector 60. The particular type of instance depends upon the type of condition definition with which the instance is associated. For example, a different class may be instantiated for each of a high/low detector, a staleness detector, a rate of change detector, and a deviation detector. Each instance of EventDetector 60 acquires any detector type-specific configuration parameters from database 28.

Alert sever 27 subscribes to solution members at step S1102. In the present example, each EventDetector 60 instance calls IValueSubscribe to indicate its solution members to AlertServer 55. AlertServer 55, in turn, uses the pub/sub mechanism to subscribe to each indicated solution member. AlertServer 55 may communicate with more than one solution server 26 at step S1102 if the solution members are associated with more than one solution server 26.

One or more updated solution member values are received at step S1103. The updated values are received by associated instances of EventDetector 60 through the IValueSink interface. Next, at step S1104, the instances of EventDetector 60 determine whether their associated conditions have experienced a state change in view of the updated values. If not, flow returns to step S1103.

Flow proceeds to step S1105 if a state change has occurred. At step S1105, the status of the associated condition is updated in database 28. If the condition requires logging, an event is placed in queue 62 and ExcursionLogger 65 logs the event to database 28. SubscriptionManager 70 is also notified of the event using the IEventSink interface.

At step S1105, SubscriptionManager 70 determines all subscriptions from database 28 that are associated with the EventDetector instance from which the event notification was received. Since the EventDetector instance is associated with a single condition definition, step S1105 may comprise determining the subscriptions that are associated with the single condition definition in database 28.

For each determined subscription, SubscriptionManager 70 uses the INotifySink interface to transmit a notification request along with subscription and event information to NotificationManager 75. NotificationManager 75 then determines, at step S1106, notification routings for each subscription.

To identify a notification routing for a subscription, NotificationManager 75 identifies a user associated with the subscription using either database 28 or using information received with the notification request from SubscriptionManager 70. NotificationManager 75 then identifies notification routings that are associated with the user from database 28. The identified notification routings may be those that are enabled and whose temporal and severity filters are satisfied. For each identified notification routing, a notification is passed to an instance of NotificationHandler 80 that is associated with the routing type. For example, an email handler receives a notification that is to be routed via email.

Figure 12:
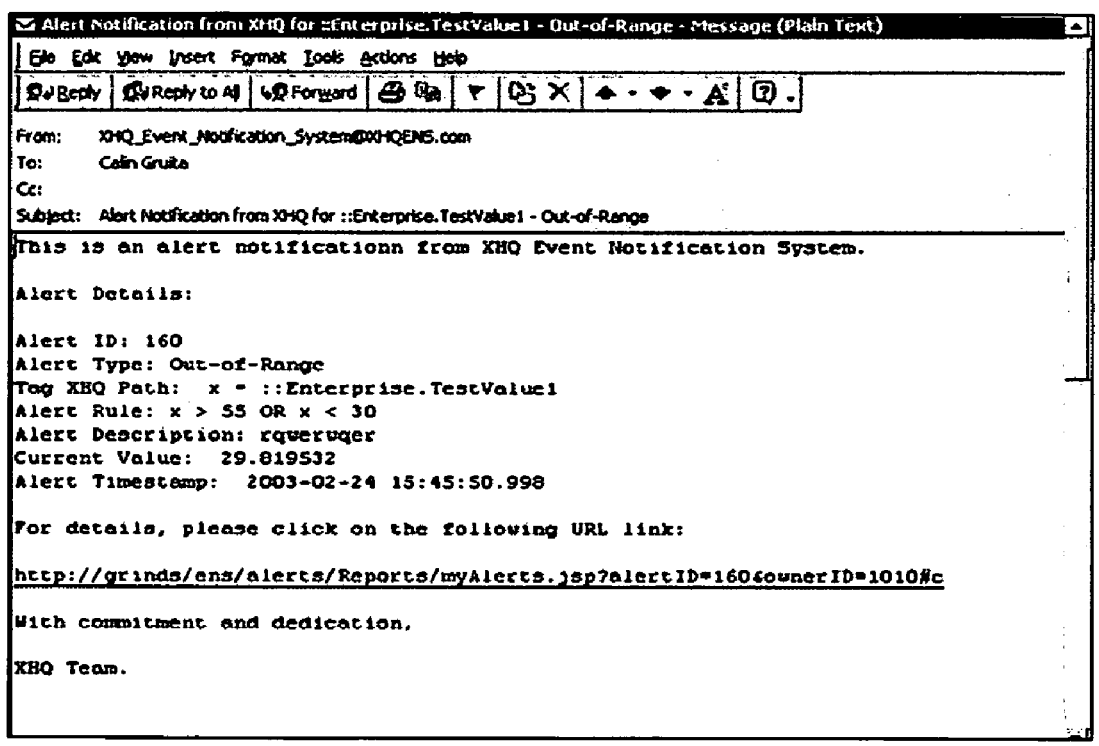
FIG. 12 is an outward view of an email notification according to some embodiments.

Next, at step S1107, a notification is routed for each subscription based on the identified routing(s). Such routing may comprise passing a notification message to an appropriate notification service 50. For example, a notification to be routed via email may be passed to a Simple Mail Transfer Protocol client service 50. FIG. 12 is a view of email notification 1200 routed to a user according to some embodiments. Notification 1200 includes information relating to the type of condition definition, the solution member, the solution member value, and the time of the event. Formats other than that shown in FIG. 12 may be used in conjunction with some embodiments.

Figure 13:
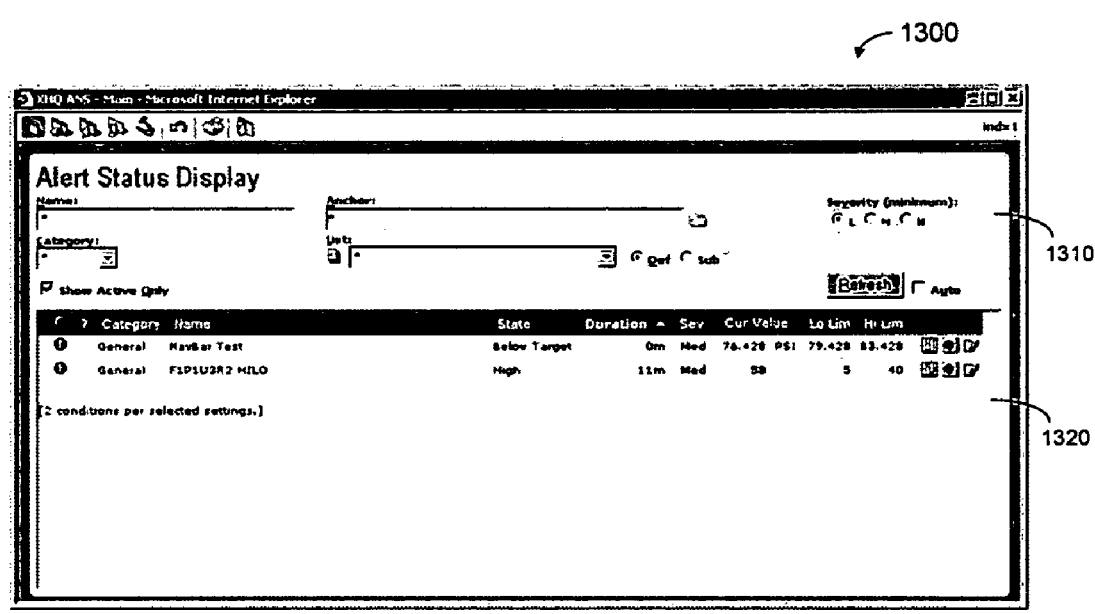
FIG. 13 is an outward view of an Alert Summary interface according to some embodiments.

FIG. 13 illustrates Alert Status dialog 1300 according to some embodiments. Dialog 1300 may be used to view condition definitions for which notifications are currently associated with a user. The data displayed in dialog 1300 may be acquired by operations data client application 42 or operations data administrator application 32 from database 28.

Filter interface 1310 allows the user to control the definitions that are displayed in display area 1320. As shown, a user may choose to view notifications that are associated with any combination of Name, Anchor, Severity, Category or List. Display area 1320 lists condition definitions that match the criteria specified in Filter interface 1310.

Figure 14:
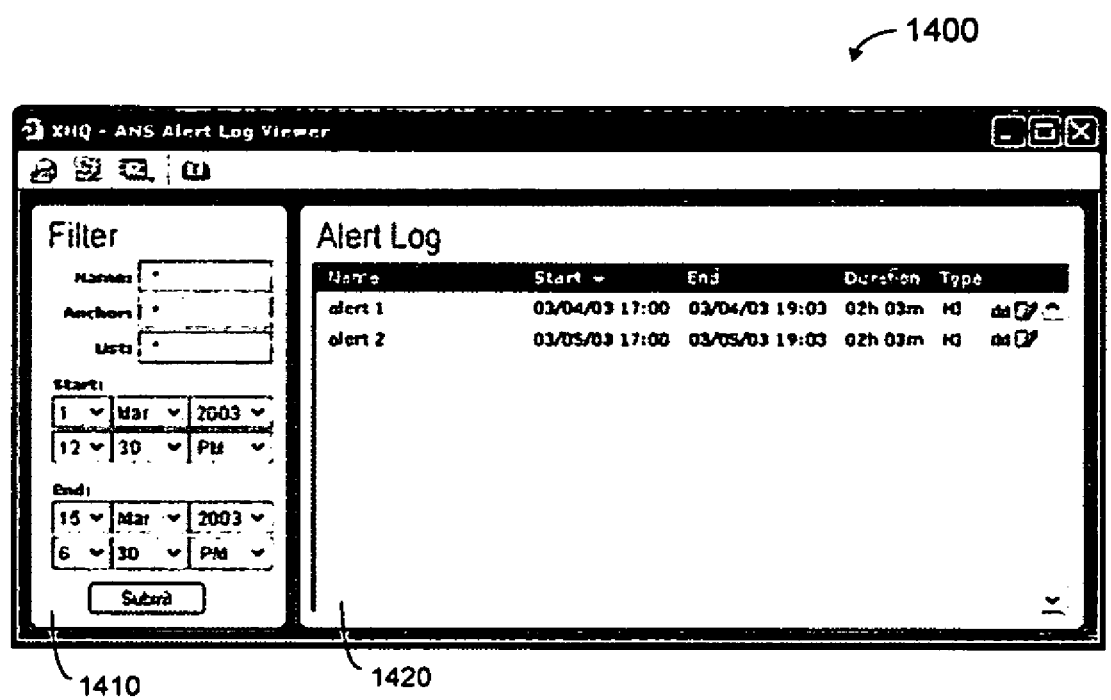
FIG. 14 is an outward view of an Alert Log interface according to some embodiments.

FIG. 14 illustrates Alert Log dialog 1400 that may also be populated by information acquired from database 28. In contrast to dialog 1300, dialog 1400 may be used to view alert information stored in database 28 by ExcursionLogger 65. Dialog 1400 includes filter interface 1410 and display area 1420.

Filter interface 1410 allows the user to control the alerts that are displayed in display area 1420. The user may choose to view notifications that are associated with any combination of Name, Anchor, List or timeframe. Display area 1420 lists alerts that match the criteria specified in Filter interface 1410.

Some embodiments therefore provide improved management and/or customization of notifications.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method to manage notifications related to a condition definition, comprising:
    receiving a condition definition from a first user;
    receiving a first instruction from the first user to provide the first user and the second user with access to the condition definition;
    receiving a second instruction from the first user to subscribe the first user to the condition definition;
    receiving a third instruction from the second user to unsubscribe the second user from the condition; and
    receiving an instruction from the first user to enable logging of an event summary record that characterizes a period between a detection of an active state of the condition and a detection of an inactive state of the condition.

2. A method according to claim 1, further comprising:
    detecting a change in the state of the condition definition; and
    determining that the first user is subscribed to the condition definition; and
    notifying the first user of the state change.

3. A method according to claim 2, wherein notifying the first user of the state change comprises:
    determining a notification routing associated with the first user; and
    notifying the first user of the state change in accordance with the notification routing.

4. A method according to claim 1, wherein receiving the first instruction from the first user comprises receiving a fourth instruction to provide a third user with access to the condition definition, the method further comprising:
    receiving a fifth instruction from the third user to associate a notification routing with the third user.

5. A method according to claim 1, wherein the event summary record includes a start time and an end time.

6. A medium storing processor-executable process steps to manage notifications related to a condition definition, the process steps comprising:
    a step to receive a condition definition from a first user;
    a step to receive a first instruction from the first user to provide the first user and a second user with access to the condition definition;
    a step to receive a second instruction from the first user to subscribe the first user to the condition definition;
    a step to receive a third instruction from the second user to unsubscribe the second user from the condition definition; and
    a step to receive an instruction from the first user to enable logging of an event summary record that characterizes a period between a detection of an active state of the condition and a detection of an inactive state of the condition.

7. A medium according to claim 6, the process steps further comprising:
    a step to detect a change in the state of the condition definition; and
    a step to determine that the first user is subscribed to the condition definition; and
    a step to notify the first user of the state change.

8. A medium according to claim 7, wherein the step to notify the first user of the state change comprises:
    a step to determine a notification routing associated with the first user; and
    a step to notify the first user of the state change in accordance with the notification routing.

9. A medium according to claim 6, wherein the step to receive the first instruction from the first user comprises a step to receive a fourth instruction to provide a-third user with access to the condition definition, and the process steps further comprising:
a step to receive a fifth instruction from the third user to associate a notification routing with the third user.

10. An apparatus to manage notifications related to a condition definition, the apparatus comprising:
a memory storing processor-executable process steps; and
a processor in communication with the memory and operative in conjunction with the stored process steps to:
receive a condition definition from a first user;
receive a first instruction from the first user to provide the first user and a second user with access to the condition definition;
receive a second instruction from the first user to subscribe the first user to the condition definition;
receive a third instruction from the second user to unsubscribe the second user from the condition definition; and
receive an instruction from the first user to enable logging of an event summary record that characterizes a period between a detection of an active state of the condition and a detection of an inactive state of the condition.

11. An apparatus according to claim 10, the processor further operative in conjunction with the stored process steps to:
detect a change in the state of the condition definition; and
determine that the first user is subscribed to the condition definition; and
notify the first user of the state change.

12. An apparatus according to claim 11, wherein notification of the first user of the state change comprises:
determination of a notification routing associated with the first user; and
notification of the first user of the state change in accordance with the notification routing.

13. An apparatus according to claim 10, wherein reception of the first instruction from the first user comprises reception of a fourth instruction to provide a third user with access to the condition definition, and the processor further operative in conjunction with the stored process steps to:
receive a fifth instruction from the third user to associate a notification routing with the third user.

14. A medium storing processor—executable process steps to provide:
an event detector to subscribe to solution members of a condition definition, to receive changes to the solution members, and to evaluate a state of the condition definition;
a subscription manager to determine users associated with the condition definition;
a notification manager to identify a notification routing for each of the determined users; and
an excursion logger to log an event summary record that characterizes a period between a detection of an active state of the condition and a detection of an inactive state of the condition.

15. A medium according to claim 14, the process steps to provide:
a notification handler to route a notification to each of the determined users based on the identified notification routing.

16. A medium according to claim 14, wherein the event detector is to receive a subscription to the condition definition from the subscription manager, and to notify the subscription manager of a change in the state of the condition definition, and
wherein the subscription manager is to identify users associated with the condition definition in response to the change in the state of the condition definition.

17. A medium according to claim 14, the process steps to provide:
an alert server to receive a plurality of condition definitions, a plurality of subscriptions to the condition definitions, and a plurality of notification routings associated with the plurality of subscriptions from a user, and to pass the plurality of condition definitions, plurality of subscriptions to the condition definitions, and plurality of notification routings associated with the plurality of subscriptions to the subscription manager.

18. A medium according to claim 17, wherein the alert server is to subscribe to the solution members, to receive the changes to the solution members, and to pass the changes to the event detector.

19. A medium according to claim 17, wherein the subscription manager is to store the plurality of condition definitions, plurality of subscriptions to the condition definitions, and plurality of notification routings associated with the plurality of subscriptions in a memory.

20. A medium according to claim 14,
wherein the excursion logger is to receive an indication of the change in the state of the condition definition from the event detector, and to log the change of state in a memory.

* * * * *